T. G. Otterson
Glass Mold.
No. 87,506. Patented Mar. 2, 1869.

Witnesses:
Wm A Steel
John Parker

Inventor:
T. G. Otterson
H. Howson
Atty.

United States Patent Office.

THOMAS G. OTTERSON, OF PHILADELPHIA, PENNSYLVANIA, ASSIGNOR TO S. B. ROWLEY, OF SAME PLACE.

*Letters Patent No. 87,506, dated March 2, 1869.*

---

IMPROVED GLASS-MOULD.

---

The Schedule referred to in these Letters Patent and making part of the same.

---

*To all whom it may concern:*

Be it known that I, THOMAS G. OTTERSON, of Philadelphia, Pennsylvania, have invented an Improvement in Glass-Moulds; and I do hereby declare the following to be a full, clear, and exact description of the same.

My invention consists of a stripper-plate, so adapted to the base and cover-plate of a glass-mould, that it may be a convenient medium for the ready removal of the pressed-glass object from the base, before it can, by cooling and shrinkage, embrace any projection on the said base so tightly as to cause the fracture of the object.

My invention further consists in arranging the projecting parts of the lower portion of the mould on a central piece, which can slide in the base, and can thus be withdrawn from the pressed glass, thereby permitting the latter to contract without danger of fracture.

In order to enable others skilled in the art to make and use my invention, I will now proceed to describe its construction and operation, reference being had to the accompanying drawing, which forms a part of this specification, and in which—

Figures 1, 2, 3, and 4, represent, in section, my improved mould, and illustrate the relative positions of the various parts in the progressive operations.

Similar letters refer to similar parts throughout the several views.

The mould consists of four main parts, namely, the plunger A, cover-plate B, stripper-plate C, and base D.

It should be understood that the plunger A and plate B are so connected to a press, that the plate B can move vertically, to a limited extent, independently of the plunger.

The base D has a central circular recess, $a$, bounded by an annular flange, $b$, between which and a rib, $c$, intervenes an annular recess, $d$, and into the latter fits snugly the annular stripper-plate C, the inner edge of which is bevelled or curved at $e$.

The stripper-plate has an annular rib, $f$, within which fits the lower portion of the cover-plate B, and the latter has a central opening, in which slides the cylindrical plunger A, and which has, on the under side, a recess, $i$.

Figure 1:
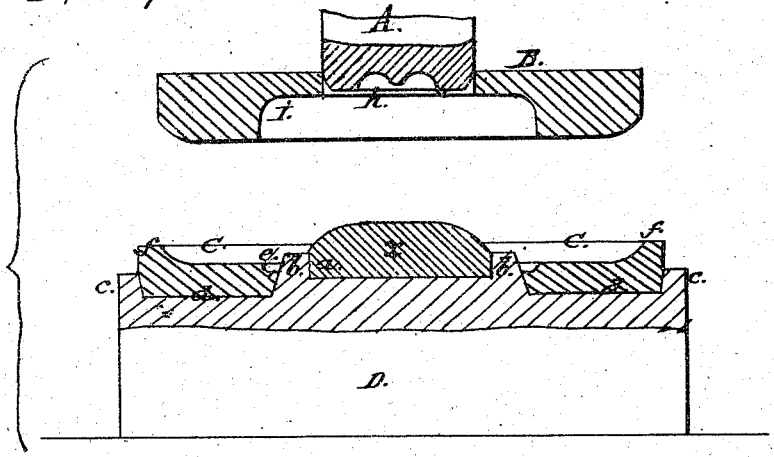

In commencing to operate with the above-described parts, they are in the position shown in fig. 1, both plunger and cover-plate being elevated to such a height above the base as to permit a proper quantity of molten glass, $x$, to be deposited in the central recess $a$ of the base, after which, both plunger and the plate B are depressed simultaneously, the plate first reaching its bearing on the stripper-plate, against which it may be held down by a suitable spring.

Figure 2:
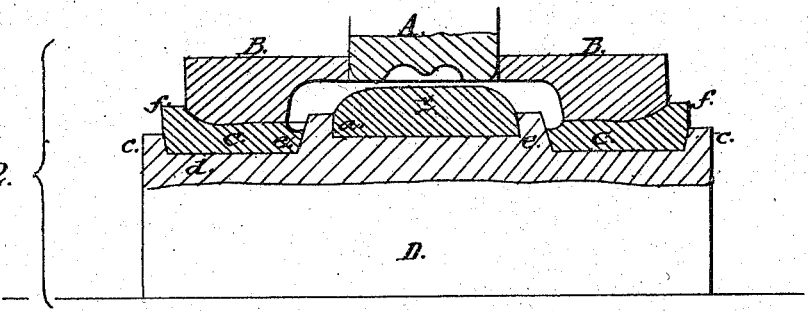
Figure 3:
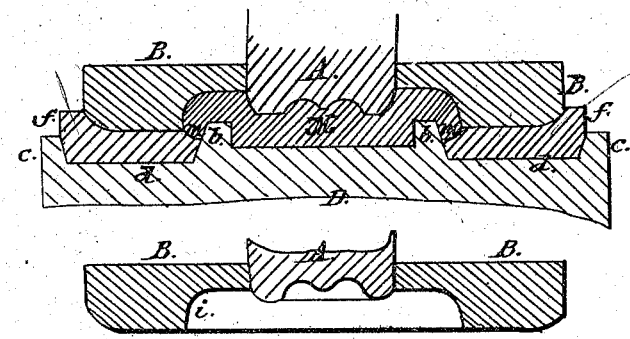

The moment the cover-plate reaches the stripper-plate, as shown in fig. 2, the plunger, continuing its descent, slides in the cover-plate, and, coming in contact with the mass of molten glass in the recess $a$ of the base, forces the said glass upward and outward, and, by the time the plunger has reached the limit of its downward movement, as shown in fig. 3, the glass is packed tightly into the space bounded above by the plunger and recessed cover-plate, and below by the stripper-plate and base, this space being, in the present instance, such as to produce a jar-cover, M, of the form clearly indicated in section, in figs 3 and 4.

Figure 4:
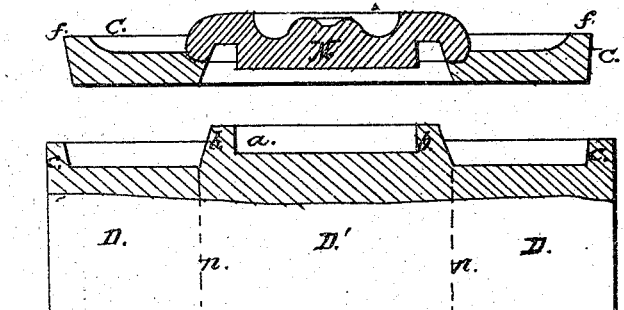

Immediately after the glass has been thus pressed, by the descent of the plunger, the latter and cover-plate B are elevated, and then, before the glass has commenced to shrink, it is elevated from the base with the stripper-plate C, as shown in fig. 4, and is then conveyed at once to the annealing oven.

In making glass jar-covers, and other objects with ribs or flanges, they are apt to break, through shrinkage, if not quickly removed from the mould. For instance, the flange $m$ of the cover (fig. 3) overlaps the annular rib $b$, on the base D, and, immediately after being moulded, commences to shrink, and, embracing the rib $b$, will break if not quickly removed. Hence, the importance of the stripper-plate C, through the medium of which the cover M can be quickly raised clear of the base, immediately after elevating the plunger and cover-plate, and is thus at liberty to contract without interruption.

A modification of the mould is illustrated in fig. 4. Instead of making the base in one piece, a central cylindrical portion, defined by the dotted lines $n\ n$, is arranged to slide in the base, the central portion having, at the top, the annular rib $b$, previously alluded to as forming part of the base.

While the glass is being pressed by the descent of the plunger, this central portion is retained in the elevated position shown in fig. 4, but after the plunger has done its duty, the central portion is quickly lowered, and its annular rib $b$ freed from the glass cover, which can be removed by the stripper-plate, as before; or, when the central sliding piece is used, the stripper-plate may be entirely dispensed with, although I prefer to use it in all cases as a ready medium for detaching and removing the moulded cover.

It will be evident that, although I have illustrated and described my invention as applied to moulds for making the glass covers of fruit-jars, it may be adapted to the moulding of all such articles of glass as are liable in cooling to contract, and so embrace projecting parts of the mould as to cause fractures.

It has not been deemed necessary to illustrate or describe the press to which the different parts of the mould are connected, as it may be similar to the presses heretofore used, and familiar to glass-manufacturers, and as the appliances for operating the parts may be modified, without interfering with the main features of my invention.

I claim as my invention, and desire to secure by Letters Patent—

1. The stripper-plate C, adapted to the base D and cover-plate B, substantially as and for the purpose herein set forth.

2. The annular rib $b$, on a central piece, D', arranged to slide in the base D, as set forth, for the purpose specified.

In testimony whereof, I have signed my name to this specification, in the presence of two subscribing witnesses.

T. G. OTTERSON.

Witnesses:
　JOHN WHITE,
　LOUIS BOSWELL.